No. 774,901. PATENTED NOV. 15, 1904.
F. V. WRIGHT.
LEVEE PROTECTOR AND PROCESS OF MAKING SAME.
APPLICATION FILED JUNE 20, 1904.
NO MODEL.

Witnesses.
Inventor.
Frank V. Wright
by Wm. F. Booth
his Attorney.

No. 774,901.

Patented November 15, 1904.

UNITED STATES PATENT OFFICE.

FRANK V. WRIGHT, OF SAN FRANCISCO, CALIFORNIA.

LEVEE-PROTECTOR AND PROCESS OF MAKING SAME.

SPECIFICATION forming part of Letters Patent No. 774,901, dated November 15, 1904.

Application filed June 20, 1904. Serial No. 213,262. (No model.)

*To all whom it may concern:*

Be it known that I, FRANK V. WRIGHT, a citizen of the United States, residing in the city and county of San Francisco, State of California, have invented certain new and useful Improvements in Levee-Protectors and Processes of Making the Same; and I do hereby declare the following to be a full, clear, and exact description of the same.

My invention relates to levee-protectors and to the art of constructing them.

My protector consists in bundles of growing willows planted upside down, the bundles being alternately inclined in opposite directions and crossing each other; and it also consists, in connection with growing willows, as aforesaid, of a suitably-staked brush-barrier along the water-line of the levee in front of the willows.

My process consists in planting the bundles of willows in the manner and arrangement above stated, and, further, in establishing in connection with said willows a brush-barrier along the water edge of the levee.

This process and the protector formed thereby, together with certain details of construction, I shall now proceed to fully explain by reference to the accompanying drawings, in which—

Figure 1:
Figure 2:
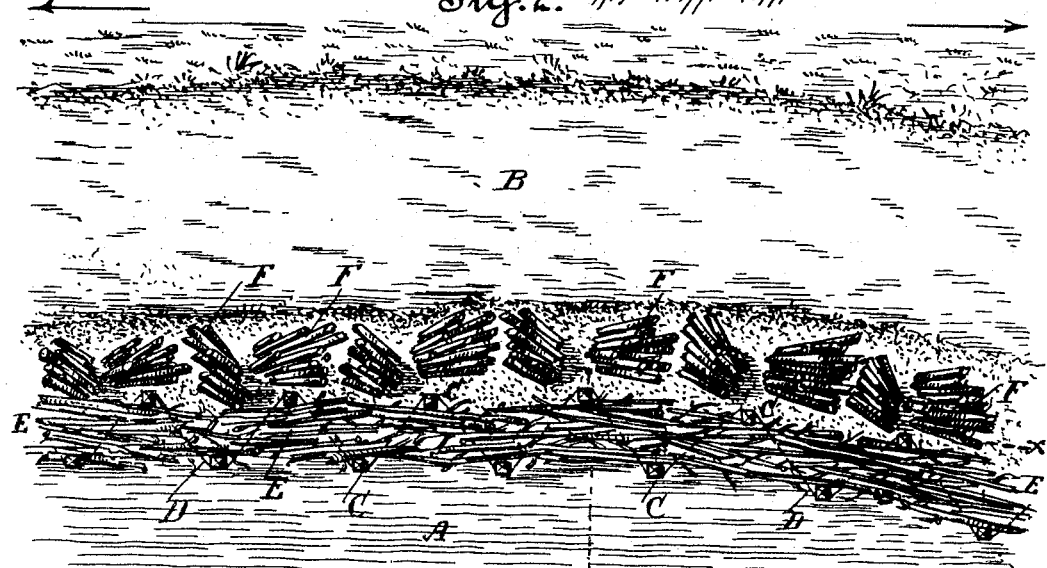
Figure 3:

Figure 1 is a vertical section transverse of the levee, showing my protector in place. Fig. 2 is a plan view of the protector in place, the willow-bundles F showing no foliage in order to avoid confusion. Fig. 3 is a view taken on the line *x x* of Fig. 2, showing the left-hand part in elevation and the right-hand part in section to show the particular inclined and crossing arrangement of the willow-bundles.

The water is indicated by A and the levee by B, Figs. 1 and 2. Along the water edge of the levee I set firmly in the ground the double row of stakes C, placed staggering, as shown in Fig. 2, and, if desired, I may secure the stakes together by a wire D. Within the space between the rows of stakes I pile brush E in bundles or otherwise, in suitable quantity and height. Then I cut willows (large branches, and even trees) and dispose them together in bundles F with their butts all in the same direction. These I plant in the ground back of the brush-barrier and close thereto. They are planted upside down—that is, their small ends or tops are inserted in the ground and their big ends or butts project a short distance above the ground just back of the brush-barrier. The best arrangement of the willow-bundles is inclined from the perpendicular in the plane of the length of the brush-barrier, alternate bundles being inclined in opposite directions, so that they cross each other, as shown. I have found by experience that the willows thus planted upside down not only grow, but they grow with the utmost luxuriance and rapidly, much more so than when planted right side up. The branches and roots from the projecting butts intertwine with the brush and bind it together in a short time most effectually. The inclined crossing arrangement of the bundles furnishes most desirable strength, and a mass of intricate foliage results in a single season, which serves the purpose admirably.

Having thus described my invention, what I claim as new, and desire to secure by Letters Patent, is—

1. That step in the process of constructing levee-protectors which consists in planting bundles of willows upside down along the edge of the levee to be protected, said bundles being alternately inclined in opposite directions and crossing each other.

2. The process of constructing levee-protectors which consists in, first, establishing a brush-barrier along the water edge of the levee and, second, in planting bundles of willows upside down along the back of the brush-barrier, said bundles being alternately inclined in opposite directions and crossing each other.

3. A levee-protector consisting of bundles of willows planted upside down along the edge of the levee to be protected, said bundles being alternately inclined in opposite directions and crossing each other.

4. A levee-protector consisting of a staked brush-barrier along the water's edge, and bundles of willows planted upside down along the back of said barrier, said bundles being alternately inclined in opposite directions and crossing each other.

In witness whereof I have hereunto set my hand.

FRANK V. WRIGHT.

Witnesses:
WALTER F. VANE,
D. B. RICHARDS.